United States Patent [19]

Neiman

[11] 4,036,393
[45] July 19, 1977

[54] CAP FOR A FUEL TANK
[75] Inventor: Michel Neiman, Paris, France
[73] Assignee: Societe de Diffusion Neiman, Courbevoie, France
[21] Appl. No.: 694,760
[22] Filed: June 10, 1976
[30] Foreign Application Priority Data
July 24, 1975 France .............................. 75.23081
[51] Int. Cl.² ............................................. B65D 51/16
[52] U.S. Cl. .................................... 220/206; 220/303; 220/374
[58] Field of Search ............... 220/203, 206, 208, 209, 220/303, 210, 360, 361, 363, 367, 373, 374; 251/126, 127, 304, 314

[56] References Cited
U.S. PATENT DOCUMENTS 2,504,072 4/1950 Friend et al. ......................... 220/374
3,913,781 10/1975 Andreaux ............................. 220/360

FOREIGN PATENT DOCUMENTS 1,394,015 5/1975 United Kingdom ................. 220/203

*Primary Examiner*—William Price
*Assistant Examiner*—Allan N. Shoap
*Attorney, Agent, or Firm*—Nolte and Nolte

[57] ABSTRACT

A cap for a fuel tank of the type comprising a labyrinth path between the fixed elements and the moving elements of the cap. Said labyrinth path is formed by concentric ribs defining grooves which intercommunicate by way of interruptions forming baffles, and a sealing element disposed on said ribs. Said sealing element has at least one projection which is adapted, in one angular position of the sealing element with respect to the labyrinth path, to close said path and, in another angular position, not to close said path.

9 Claims, 3 Drawing Figures

CAP FOR A FUEL TANK

The present invention relates to a novel cap for a fuel tank, in particular for automobiles.

It is known that, depending on the type of vehicle, the fuel tank caps must be or need not be vented, that is to say, must have or need not have means for evacuating over-pressure gasses formed in the tank. This problem is posed for caps which are otherwise identical, so that special parts must be provided for the vented caps and this requires a stock of a larger number of parts and special precautions when assembling.

It has, moreover, been proposed, for venting such a cap, to form a labyrinth between the fixed elements and moving elements of the cap by means of concentric ribs defining grooves which intercommunicate by way of interruptions constituting baffles, with a sealing element disposed on these ribs. The pressure drops in this labyrinth path ensure that the evacuation occurs only above a predetermined gas pressure and that, moreover, exterior fluids, in particular steam, cannot enter the tank by travelling in the opposite direction through the labyrinth path.

This arrangement ensures the venting of the tank very effectively, practically without increasing the overall size of the cap. However, it still requires special parts for the vented caps.

An object of the present invention is to improve the aforementioned caps of the known type so as to permit assembling them indifferently vented or non-vented. Another object of the invention is to provide means for identifying the type of cap upon its assembly which avoid any risk of error and readily lend themselves to an automatized assembly.

According to the invention, there is provided a cap for a fuel tank of the type comprising a labyrinth path between the fixed elements and the moving elements of the cap, said labyrinth path being formed by concentric ribs defining grooves which intercommunicate by way of interruptions constituting baffles, and a sealing element disposed on said ribs, wherein said sealing element comprises at least one projection which is adapted, in one angular position of the sealing element with respect to the labyrinth path, to close said path and, in another angular position, not to close the path. Thus with the same component parts it is possible to construct indifferently a ventilated cap or a non-ventilated cap.

In one embodiment, the sealing element has a lug disposed in such manner as to close the entrance of the labyrinth path for one angular position of the sealing element with respect to the path, and not to enter this path for a diametrally opposed position of the lug.

Preferably, the sealing element has a cut-out opening and the labyrinth path carries, in facing relation to said opening for each of the two angular positions, a characteristic distinctive indication of said angular position. The reading of this distinctive indication, for example the expression "vented" or "non-vented" permits the type of cap to be recognized immediately. Moreover, when assembling the fixed and moving parts of the cap, there may be provided a feeler which cooperates with the opening for reading the type of cap in the course of assembly so that any risk of error is avoided in a sure manner.

An understanding of the invention will be had from the ensuing description with reference to the accompanying drawing in which.

Figure 1:
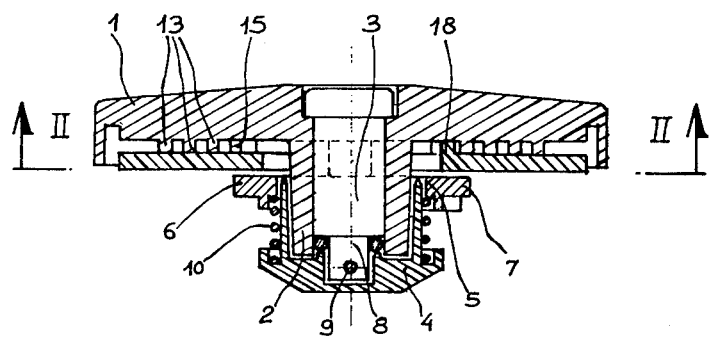
FIG. 1 is a radial sectional view of a cap according to one embodiment of the invention.

In the illustrated embodiment, the cap comprises a cover 1 provided with a central hollow depending portion 2 in which a barrel-type lock 3 is mounted. A movable assembly, comprising a driving core 4 and a ring 5 having wings 6 and 7, is rendered integral with the end of the barrel 8 of the lock 3 by a pin 9. A coil spring 10 is interposed between the core 4 and the ring 5.

Figure 2:
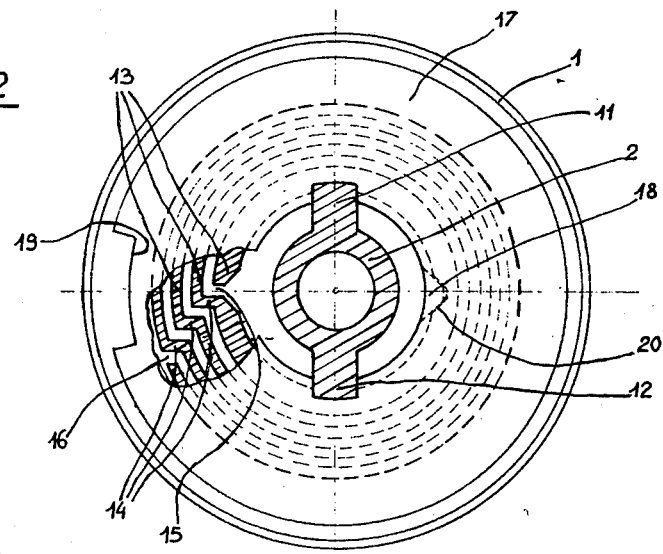
FIG. 2 is a sectional view taken on line II—II of FIG. 1, with a part cut away.

The ring 5 bears against two diametrally opposed wings 11 and 12 (FIGS. 2 and 3) which laterally extend from the depending portion 2. The inner face of the cover 1 carries a labyrinth path constituted by concentric ribs 13 defining grooves which intercommunicate by way of baffles 14. This labyrinth path has an entrance 15 and an exit 16 located in the vicinity of the edge of the cover 1. A rubber sealing element 17 bears against the ribs 13.

In the described embodiment, the sealing element 17 carries a lug 18 and a peripheral aperture or notch 19. In the position shown in FIG. 2, the lug 18 occupies recess 20 formed in the rib 13 which is the nearest to the axis of the cap and diametrally opposed to the entrance 15. Under the notch 19 the cover 1 carries the word "vented" which is visible through the notch. The entrance 15 of the labyrinth path is not closed and the cap is threfore vented.

Figure 3:
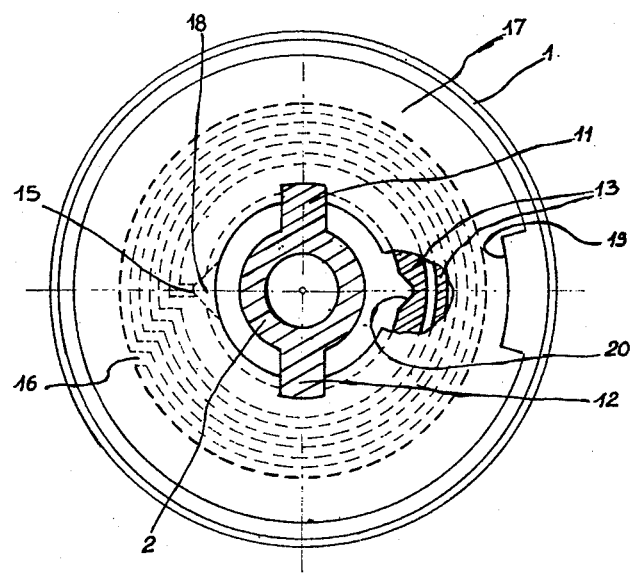
FIG. 3 is similar to FIG. 2 in respect of another position of the sealing element.

In the position shown in FIG. 3, the sealing element 17 has been rotated through 180° about the axis of the cap. The lug 18 closes the entrance 15 of the labyrinth path and the cap is not vented. The notch 19 uncovers the marking "non-vented" carried by the cover 1 and diametrally opposed to the word "vented".

Although the illustrated embodiment concerns a cap of the anti-theft type, i.e. comprising a lock, the invention is naturally also applicable to caps without a lock.

What is claimed is:

1. A cap for a fuel tank comprising a closure element having an inside surface which in use faces towards the interior of the tank, means defining a labyrinthine venting passage on said inside surface, said passage having exit and entrance ends, and plug means movable between first and second positions relative to said means defining said passage, in one of said positions being effective to close said passage and in the other position being effective to open said passage.

2. A cap as claimed in claim 1 wherein said plug means is engageable with one of said ends of said labyrinthine passage in said position effective to close said passage.

3. A cap as claimed in claim 2 wherein said plug means is effective to close said passage by sealing engagement with said entrance of said passage.

4. A cap as claimed in claim 1 comprising a second closure element disposed in confronting relationship with said inside surface, said labyrinthine venting passage being disposed between said closure elements, said plug means being formed on one of said elements and said element having said plug means being movable between first and second positions relative to the other of said elements.

5. A cap as claimed in claim 4 wherein said one of said elements is rotatable relative to the other of said elements.

6. A cap as claimed in claim 5 wherein said one of said elements is rotatable through 180° between said first and second positions.

7. A cap as claimed in claim 4 wherein one of said elements carries distinctive markings and the other of said elements includes indicia means said indicia means indicating one of said markings in said first position and the other of said markings in the second position.

8. A cap as claimed in claim 7 wherein said indicia means comprises an opening through which one of said markings is visible in said first position and through which the other of those markings is visible in the second position.

9. A cap for a fuel tank comprising a first closure element having an inside surface which in use faces towards the interior of the tank, a second closure element disposed in confronting relationship with said inside surface of said first closure element, means between said first and second elements defining a labyrinthine venting passage having exit and entrance ends, one of said elements having plug means and being movable between first and second positions relative to the other of said elements, in one of said positions being effective to close said passage by sealing engagement of said plug means with one of said ends of said passage and in the other position being effective to open said passage by disengaging said plug means from said one end of the passage.

* * * * *